United States Patent
Huang et al.

(10) Patent No.: US 10,135,575 B2
(45) Date of Patent: Nov. 20, 2018

(54) BASE STATION, USER EQUIPMENT, AND ADAPTIVE RETRANSMISSION METHOD

(71) Applicant: Huawei Technologies Co., Ltd., Shenzhen (CN)

(72) Inventors: Lei Huang, Shanghai (CN); Yi Wang, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 28 days.

(21) Appl. No.: 15/240,417

(22) Filed: Aug. 18, 2016

(65) Prior Publication Data
US 2016/0359585 A1    Dec. 8, 2016

Related U.S. Application Data

(63) Continuation of application No. PCT/CN2014/072261, filed on Feb. 19, 2014.

(51) Int. Cl.
*G08C 25/02*    (2006.01)
*H04L 1/18*    (2006.01)
(Continued)

(52) U.S. Cl.
CPC .............. *H04L 1/08* (2013.01); *H04L 1/14* (2013.01); *H04L 1/1607* (2013.01);
(Continued)

(58) Field of Classification Search
CPC . H04L 1/1887; H04L 1/08; H04L 1/14; H04L 1/1607; H04L 5/0055;
(Continued)

(56) References Cited

U.S. PATENT DOCUMENTS

| 4,882,765 A | 11/1989 | Maxwell et al. |
| 2008/0108355 A1 | 5/2008 | Oleszcsuk |

(Continued)

FOREIGN PATENT DOCUMENTS

| CN | 101421962 A | 4/2009 |
| CN | 101682846 A | 3/2010 |

(Continued)

OTHER PUBLICATIONS

"3rd Generation Partnership Project; Technical Specification Group Radio Access Network; Evolved Universal Terrestrial Radio Access (E-UTRA); Study on Small Cell Enhancements for E-UTRA and E-UTRAN—Higher Layer Aspects (Release 12)," 3GPP TR 36.842 V0.2.0, May 2013, pp. 1-38.

(Continued)

*Primary Examiner* — Guerrier Merant
(74) *Attorney, Agent, or Firm* — Slater Matsil, LLP

(57) ABSTRACT

The present application relates to a base station, user equipment, and an adaptive retransmission method. The base station includes a sending unit, configured to send a data packet to user equipment by using a radio resource on a first frequency band, The base station also includes a receiving unit, configured to receive feedback information sent by the user equipment, where the feedback information is used to indicate whether the data packet is successfully sent. The sending unit is further configured to, if the feedback information indicates that the data packet fails to be sent, send the data packet to the user equipment by using a radio resource on a second frequency band. The first frequency band and the second frequency band have an overlapping coverage area, and the user equipment is within the overlapping coverage area.

12 Claims, 13 Drawing Sheets

(51) Int. Cl.
*H04L 1/08* (2006.01)
*H04L 1/14* (2006.01)
*H04L 1/16* (2006.01)
*H04L 5/00* (2006.01)
*H04W 72/04* (2009.01)
*H04W 74/04* (2009.01)
*H04L 1/00* (2006.01)

(52) U.S. Cl.
CPC .......... *H04L 1/1887* (2013.01); *H04L 1/1893* (2013.01); *H04L 5/0055* (2013.01); *H04W 72/0453* (2013.01); *H04W 74/04* (2013.01); *H04L 2001/0097* (2013.01)

(58) Field of Classification Search
CPC .......... H04L 1/1893; H04L 2001/0097; H04L 5/023; H04L 27/2601; H04L 2001/0092; H04L 5/0007; H04L 5/0064; H04L 5/0075; H04L 5/0087; H04L 5/0042; H04L 5/006; H04W 72/0453; H04W 74/04
See application file for complete search history.

(56) References Cited

U.S. PATENT DOCUMENTS

| | | | | |
|---|---|---|---|---|
| 2008/0144572 | A1* | 6/2008 | Makhijani | H04L 1/1887 370/330 |
| 2008/0212510 | A1* | 9/2008 | Larsson | H04L 1/004 370/312 |
| 2009/0049356 | A1* | 2/2009 | Lin | H04L 1/0025 714/749 |
| 2009/0175369 | A1 | 7/2009 | Atarashi et al. | |
| 2009/0268679 | A1* | 10/2009 | Suga | H04L 5/0007 370/329 |
| 2009/0279480 | A1* | 11/2009 | Rosenqvist | H04L 1/1887 370/328 |
| 2010/0246477 | A1 | 9/2010 | Hasegawa | |
| 2011/0182327 | A1 | 7/2011 | Matsumoto et al. | |
| 2012/0213148 | A1 | 8/2012 | Saito et al. | |
| 2012/0320853 | A1 | 12/2012 | Kwon et al. | |
| 2012/0322365 | A1 | 12/2012 | Davies | |
| 2013/0188507 | A1 | 7/2013 | Dayal et al. | |
| 2013/0223377 | A1 | 8/2013 | Doppler et al. | |

FOREIGN PATENT DOCUMENTS

| | | |
|---|---|---|
| JP | 2004229087 A | 8/2004 |
| JP | 2008283567 A | 11/2008 |
| JP | 2010521927 A | 6/2010 |
| JP | 2010226476 A | 10/2010 |
| WO | 2010035496 A1 | 4/2010 |
| WO | 2011052022 A1 | 5/2011 |
| WO | 2011145474 A1 | 11/2011 |

OTHER PUBLICATIONS

Ericsson, "Carrier Aggregation in LTE-Advanced," TSG-RANWG1 #53bis, R1-082468, Jun. 30-Jul. 4, 2008, pp. 1-6, Warsaw, Poland.

* cited by examiner

BASE STATION, USER EQUIPMENT, AND ADAPTIVE RETRANSMISSION METHOD

CROSS-REFERENCE TO RELATED APPLICATIONS

This application claims the benefit of International Application No. PCT/CN2014/072261, filed on Feb. 19, 2014, which application is hereby incorporated herein by reference.

TECHNICAL FIELD

The present application relates to the field of communications technologies, and in particular, to a base station, user equipment, and an adaptive retransmission method.

BACKGROUND

In an existing communications system, each base station has an adaptive retransmission function. When a base station fails to send a data packet to user equipment, the base station resends the data packet to the user equipment, to ensure that the user equipment can properly receive the data packet. The base station uses a radio resource on a same frequency band to initially send the data packet and resend the data packet. Therefore, when initially sending the data packet and scheduling the radio resource for the data packet, the base station needs to consider a radio resource required for retransmitting the data packet, which leads to a relatively complex algorithm for scheduling the radio resource. In addition, because each base station needs to have the adaptive retransmission function, modules such as a retransmission scheduling module and a buffer module needs to be configured for the base station, which leads to a relatively high construction cost of an entire communications system.

SUMMARY

In view of this, embodiments of the present application provide a base station, user equipment, and an adaptive retransmission method, which can effectively reduce complexity of an algorithm for scheduling a radio resource, and effectively reduce a construction cost of a communications system.

According to a first aspect, an embodiment of the present application provides a base station. The base station includes: a transmitter, configured to send a data packet to user equipment by using a radio resource on a first frequency band. The base station also includes a receiver, configured to receive feedback information sent by the user equipment, where the feedback information is used to indicate whether the data packet is successfully sent. The transmitter is further configured to: if the feedback information indicates that the data packet fails to be sent, send the data packet to the user equipment by using a radio resource on a second frequency band. The first frequency band and the second frequency band have an overlapping coverage area, and the user equipment is within the overlapping coverage area.

In a first possible implementation manner of the first aspect, the transmitter is configured to send the data packet to a small cell, so that the small cell sends the data packet to the user equipment by using the radio resource on the first frequency band.

With reference to the first possible implementation manner of the first aspect, in a second possible implementation manner, the base station further includes: a processor coupled to the transmitter, configured to: before the transmitter sends the data packet to the user equipment by using a radio resource on the first frequency band, schedule the radio resource on the first frequency band for the data packet; and the transmitter is further configured to send scheduling information to the small cell, where the scheduling information includes information about the radio resource on the first frequency band that is scheduled for the data packet, so that the small cell sends, according to the scheduling information, the data packet to the user equipment by using the scheduled radio resource on the first frequency band.

With reference to the first possible implementation manner of the first aspect, in a third possible implementation manner, the receiver is further configured to: after the transmitter sends the data packet to the user equipment, receive data packet information sent by the small cell, where the data packet information includes an identifier of the data packet.

With reference to the first aspect or the first possible implementation manner of the first aspect or the second possible implementation manner of the first aspect or the third possible implementation manner of the first aspect, in a fourth possible implementation manner, the processor is further configured to: before the receiver receives the feedback information sent by the user equipment, acquire the buffered data packet according to the identifier of the data packet; and schedule the radio resource on the second frequency band for the data packet.

With reference to the first aspect or the first possible implementation manner of the first aspect or the second possible implementation manner of the first aspect or the third possible implementation manner of the first aspect, in a fifth possible implementation manner, the processor is further configured to: after the receiver receives the feedback information sent by the user equipment, acquire the buffered data packet according to the identifier of the data packet; and schedule the radio resource on the second frequency band for the data packet.

With reference to the first aspect or the first possible implementation manner of the first aspect or the second possible implementation manner of the first aspect or the third possible implementation manner of the first aspect or the fourth possible implementation manner of the first aspect or the fifth possible implementation manner of the first aspect, in a sixth possible implementation manner, the first frequency band is higher than the second frequency band.

According to a second aspect, an embodiment of the present application provides user equipment. The user equipment includes: a receiver, configured to receive a data packet that is sent by a base station by using a radio resource on a first frequency band. The user equipment also includes a processor coupled to the receiver, configured to determine whether the data packet is successfully sent. The user equipment also includes a transmitter, configured to send feedback information to the base station, where the feedback information is used to indicate whether the data packet is successfully sent. The receiver is further configured to: if the feedback information indicates that the data packet fails to be sent, receive the data packet that is sent by the base station by using a radio resource on a second frequency band. The first frequency band and the second frequency band have an overlapping coverage area, and the user equipment is within the overlapping coverage area.

In a first possible implementation manner of the second aspect, the transmitter is configured to send the feedback information to the base station by using a small cell.

With reference to the second aspect or the first possible implementation manner of the second aspect, in a second possible implementation manner, the first frequency band is higher than the second frequency band.

According to a third aspect, an embodiment of the present application provides an adaptive retransmission method. The method includes: sending a data packet to user equipment by using a radio resource on a first frequency band. The method also includes receiving feedback information sent by the user equipment, where the feedback information is used to indicate whether the data packet is successfully sent. The method also includes, if the feedback information indicates that the data packet fails to be sent, sending the data packet to the user equipment by using a radio resource on a second frequency band. The first frequency band and the second frequency band have an overlapping coverage area, and the user equipment is within the overlapping coverage area.

In a first possible implementation manner of the third aspect, the sending a data packet to user equipment by using a radio resource on a first frequency band is specifically: sending the data packet to a small cell, so that the small cell sends the data packet to the user equipment by using the radio resource on the first frequency band.

With reference to the first possible implementation manner of the third aspect, in a second possible implementation manner, before the sending a data packet to user equipment by using a radio resource on a first frequency band, the method further includes: scheduling the radio resource on the first frequency band for the data packet; and sending scheduling information to the small cell, where the scheduling information includes information about the radio resource on the first frequency band that is scheduled for the data packet, so that the small cell sends, according to the scheduling information, the data packet to the user equipment by using the scheduled radio resource on the first frequency band.

With reference to the first possible implementation manner of the third aspect, in a third possible implementation manner, after the sending a data packet to user equipment by using a radio resource on a first frequency band, the method further includes: receiving data packet information sent by the small cell, where the data packet information includes an identifier of the data packet.

With reference to the third aspect or the first possible implementation manner of the third aspect or the second possible implementation manner of the third aspect or the third possible implementation manner of the third aspect, in a fourth possible implementation manner, before the receiving feedback information sent by the user equipment, the method further includes: acquiring the buffered data packet according to the identifier of the data packet; and scheduling the radio resource on the second frequency band for the data packet.

With reference to the third aspect or the first possible implementation manner of the third aspect or the second possible implementation manner of the third aspect or the third possible implementation manner of the third aspect, in a fifth possible implementation manner, after the receiving feedback information sent by the user equipment, the method further includes: acquiring the buffered data packet according to the identifier of the data packet; and scheduling the radio resource on the second frequency band for the data packet.

With reference to the third aspect or the first possible implementation manner of the third aspect or the second possible implementation manner of the third aspect or the third possible implementation manner of the third aspect or the fourth possible implementation manner of the third aspect or the fifth possible implementation manner of the third aspect, in a sixth possible implementation manner, the first frequency band is higher than the second frequency band.

According to the foregoing solutions, a base station initially sends a data packet to user equipment by using a radio resource on a first frequency band, and if the data packet fails to be sent, the base station sends the data packet to the user equipment by using a radio resource on a second frequency band. The data packet is initially sent by the base station to the user equipment by using the radio resource on the first frequency band, and the data packet is re-sent to the user equipment by using the radio resource on the second frequency band. That is, initially sending the data packet and resending the data packet are performed on different frequency bands. Therefore, when the base station schedules the radio resource on the first frequency band for the data packet, a radio resource required for retransmitting the data packet does not need to be considered, which can effectively reduce complexity of an algorithm for scheduling the radio resource.

DETAILED DESCRIPTION OF ILLUSTRATIVE EMBODIMENTS

To make the objectives, technical solutions, and advantages of the present application clearer, the following further describes the present application in detail with reference to the accompanying drawings. Apparently, the described embodiments are merely some but not all of the embodiments of the present application. All other embodiments obtained by a person of ordinary skill in the art based on the embodiments of the present application without creative efforts shall fall within the protection scope of the present application.

Embodiment 1

Figure 1:
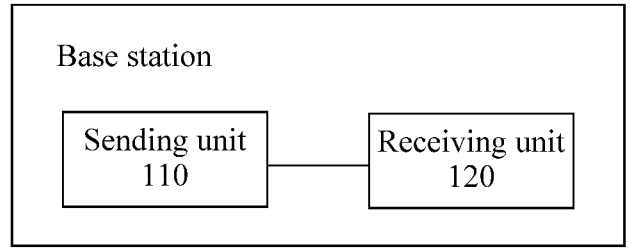
FIG. 1 is a schematic structural diagram of a base station according to Embodiment 1 of the present application.

As shown in FIG. 1, FIG. 1 is a schematic structural diagram of a base station according to Embodiment 1 of the present application. The base station includes a sending unit 110 and a receiving unit 120.

The sending unit 110 is configured to send a data packet to user equipment by using a radio resource on a first frequency band.

The receiving unit 120 is configured to receive feedback information sent by the user equipment, where the feedback information is used to indicate whether the data packet is successfully sent.

The sending unit 110 is further configured to: if the feedback information indicates that the data packet fails to be sent, send the data packet to the user equipment by using a radio resource on a second frequency band.

The first frequency band and the second frequency band have an overlapping coverage area, and the user equipment is within the overlapping coverage area.

Further, the sending unit 110 is specifically configured to: send the data packet to a small cell, so that the small cell sends the data packet to the user equipment by using the radio resource on the first frequency band.

Figure 2:
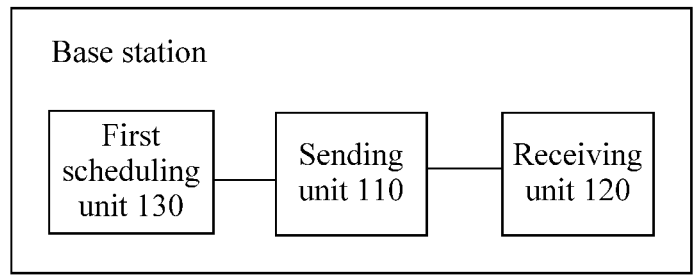
FIG. 2 is a schematic structural diagram of another base station according to Embodiment 1 of the present application.

Further, as shown in FIG. 2, the base station may further include a first scheduling unit 130.

The first scheduling unit 130 is configured to: before the sending a data packet to user equipment by using a radio resource on a first frequency band, schedule the radio resource on the first frequency band for the data packet. Correspondingly, the sending unit 110 is further configured to send scheduling information to the small cell, where the scheduling information includes information about the radio resource on the first frequency band that is scheduled for the data packet, so that the small cell sends, according to the scheduling information, the data packet to the user equipment by using the scheduled radio resource on the first frequency band.

Further, the receiving unit 120 is further configured to: after the data packet is sent to the user equipment by using the radio resource on the first frequency band, receive data packet information sent by the small cell, where the data packet information includes an identifier of the data packet.

Figure 3:
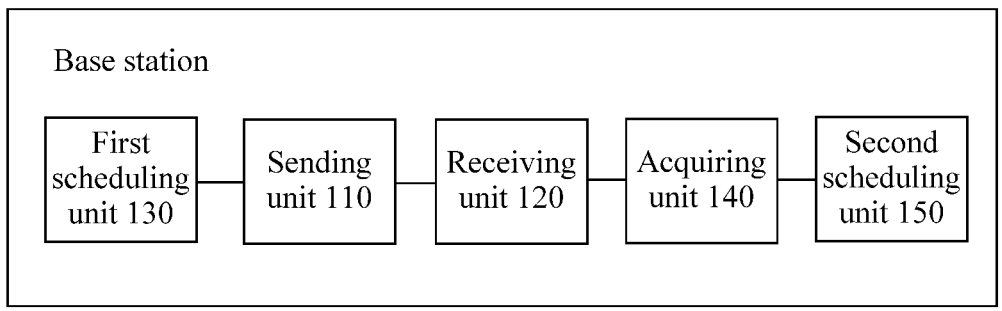
FIG. 3 is a schematic structural diagram of still another base station according to Embodiment 1 of the present application.

Further, as shown in FIG. 3, the base station may further include an acquiring unit 140 and a second scheduling unit 150.

The acquiring unit 140 is configured to, before the receiving unit 120 receives the feedback information sent by the user equipment or after the receiving unit 120 receives the feedback information sent by the user equipment, acquire the buffered data packet according to the identifier of the data packet; and the second scheduling unit 150 is configured to schedule the radio resource on the second frequency band for the data packet.

Further, the first frequency band is higher than the second frequency band.

In hardware implementation, the foregoing sending unit 110 may be a transmitter or a transceiver, the foregoing receiving unit 120 may be a receiver or a transceiver, and the sending unit 110 and the receiving unit 120 may be integrated to form a transceiving unit, which is a transceiver corresponding to the hardware implementation. The first scheduling unit 130, the acquiring unit 140, and the second scheduling unit 150 in the foregoing may be built in or independent of a processor of the base station in a hardware form, or may also be stored in a memory of the base station in a software form, so that the processor invokes and executes an operation corresponding to each of the foregoing modules. The processor may be a central processing unit (CPU), a microprocessor, a single-chip microcomputer, or the like.

According to the base station provided in Embodiment 1 of the present application, the base station initially sends a data packet to user equipment by using a radio resource on a first frequency band, and if the data packet fails to be sent, the base station sends the data packet to the user equipment by using a radio resource on a second frequency band. The data packet is initially sent by the base station to the user equipment by using the radio resource on the first frequency band, and the data packet is re-sent to the user equipment by using the radio resource on the second frequency band. That is, initially sending the data packet and resending the data packet are performed on different frequency bands. Therefore, when the base station schedules the radio resource on the first frequency band for the data packet, a radio resource required for retransmitting the data packet does not need to be considered, which can effectively reduce complexity of an algorithm for scheduling the radio resource.

Embodiment 2

Figure 4:
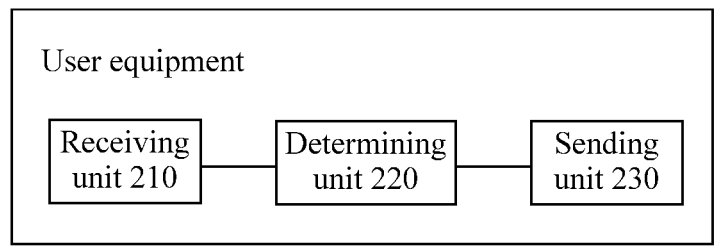
FIG. 4 is a schematic structural diagram of user equipment according to Embodiment 2 of the present application.

As shown in FIG. 4, FIG. 4 is a schematic structural diagram of user equipment according to Embodiment 2 of the present application. The user equipment includes a receiving unit 210, a determining unit 220, and a sending unit 230.

The receiving unit 210 is configured to receive a data packet that is sent by a base station by using a radio resource on a first frequency band.

The determining unit 220 is configured to determine whether the data packet is successfully sent.

The sending unit 230 is configured to send feedback information to the base station, where the feedback information is used to indicate whether the data packet is successfully sent.

The receiving unit 210 is further configured to: if the feedback information indicates that the data packet fails to be sent, receive the data packet that is sent by the base station by using a radio resource on a second frequency band.

The first frequency band and the second frequency band have an overlapping coverage area, and the user equipment is within the overlapping coverage area. That the first frequency band and the second frequency band have an overlapping coverage area may be presented in multiple forms. For example, a part of a coverage area of the first frequency band overlaps with a part of a coverage area of the second frequency band, or a coverage area of one frequency band is within a coverage area of the other frequency band.

Further, the sending unit 230 is specifically configured to send the feedback information to the base station by using a small cell.

Further, the first frequency band is higher than the second frequency band.

In hardware implementation, the foregoing receiving unit 210 may be a receiver or a transceiver, the foregoing sending unit 230 may be a transmitter or a transceiver, and the receiving unit 210 and the sending unit 230 may be integrated to form a transceiving unit, which is a transceiver corresponding to the hardware implementation. The foregoing determining unit 220 may be built in or independent of a processor of the user equipment in a hardware form, or may also be stored in a memory of the base station in a software form, so that the processor invokes and executes an operation corresponding to each of the foregoing modules. The processor may be a central processing unit (CPU), a microprocessor, a single-chip microcomputer, or the like.

According to the user equipment provided in Embodiment 2 of the present application, the user equipment first receives a data packet that is sent by a base station by using a radio resource on a first frequency band, and if the data packet fails to be sent, the user equipment receives the data packet that is sent by the base station by using a radio resource on a second frequency band. The data packet is initially sent by the base station to the user equipment by using the radio resource on the first frequency band, and the data packet is re-sent to the user equipment by using the radio resource on the second frequency band. That is, initially sending the data packet and resending the data packet are performed on different frequency bands. Therefore, when the base station schedules the radio resource on the first frequency band for the data packet, a radio resource required for retransmitting the data packet does not need to be considered, which can effectively reduce complexity of an algorithm for scheduling the radio resource.

Embodiment 3

Figure 5:
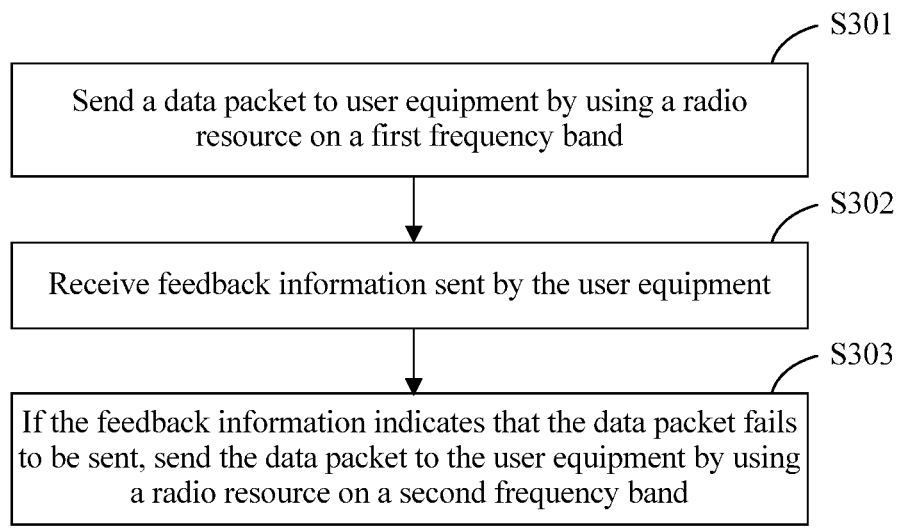
FIG. 5 is a schematic flowchart of an adaptive retransmission method according to Embodiment 3 of the present application.

As shown in FIG. 5, FIG. 5 is a schematic flowchart of an adaptive retransmission method according to Embodiment 3 of the present application. The adaptive retransmission method is executed by a base station and may be specifically executed by the base station provided in Embodiment 1 of the present application.

The adaptive retransmission method includes the following steps.

Step S301. Send a data packet to user equipment by using a radio resource on a first frequency band.

Step S302. Receive feedback information sent by the user equipment, where the feedback information is used to indicate whether the data packet is successfully sent.

Step S303. If the feedback information indicates that the data packet fails to be sent, send the data packet to the user equipment by using a radio resource on a second frequency band.

The first frequency band and the second frequency band have an overlapping coverage area, and the user equipment is within the overlapping coverage area.

Further, in step S301, the sending a data packet to user equipment by using a radio resource on a first frequency band is specifically: sending the data packet to a small cell, so that the small cell sends the data packet to the user equipment by using the radio resource on the first frequency band.

Further, in step S301, before the sending a data packet to user equipment by using a radio resource on a first frequency band, the method further includes: scheduling the radio frequency resource on the first frequency band for the data packet; and sending scheduling information to the small cell, where the scheduling information includes information about the radio resource on the first frequency band that is scheduled for the data packet, so that the small cell sends, according to the scheduling information, the data packet to the user equipment by using the scheduled radio resource on the first frequency band.

Further, in step S301, after the sending a data packet to user equipment by using a radio resource on a first frequency band, the method further includes: receiving data packet information sent by the small cell, where the data packet information includes an identifier of the data packet.

Further, in step S302, before the receiving feedback information sent by the user equipment, the method further includes: acquiring the buffered data packet according to the identifier of the data packet; and scheduling the radio resource on the second frequency band for the data packet.

Further, in step S302, after the receiving feedback information sent by the user equipment, the method further includes: acquiring the buffered data packet according to the identifier of the data packet; and scheduling the radio resource on the second frequency band for the data packet.

Further, the first frequency band is higher than the second frequency band.

According to the adaptive retransmission method provided in Embodiment 3 of the present application, a base station initially sends a data packet to user equipment by using a radio resource on a first frequency band, and if the data packet fails to be sent, the base station sends the data packet to the user equipment by using a radio resource on a second frequency band. The data packet is initially sent by the base station to the user equipment by using the radio resource on the first frequency band, and the data packet is re-sent to the user equipment by using the radio resource on the second frequency band. That is, initially sending the data packet and resending the data packet are performed on different frequency bands. Therefore, when the base station schedules the radio resource on the first frequency band for the data packet, a radio resource required for retransmitting the data packet does not need to be considered, which can effectively reduce complexity of an algorithm for scheduling the radio resource.

Embodiment 4

Figure 6:
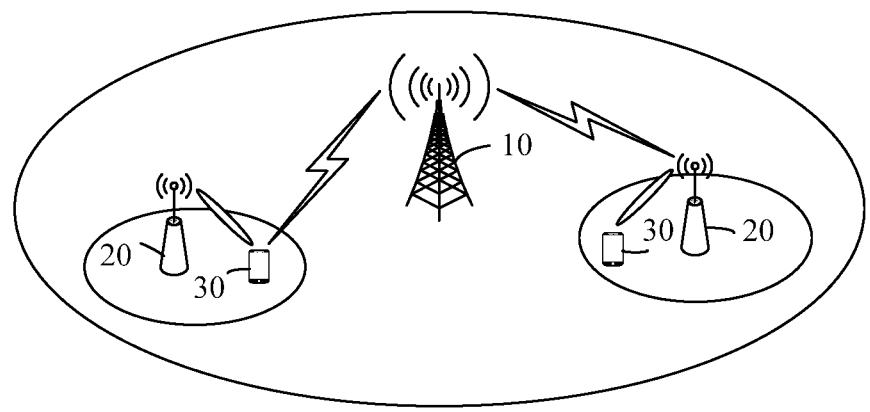
FIG. 6 is a schematic diagram of an architecture of a communications system according to Embodiment 4 of the present application.

As shown in FIG. 6, FIG. 6 is a schematic diagram of an architecture of a communications system according to Embodiment 4 of the present application. The communications system includes a base station 10, a small cell 20, and user equipment 30. The base station 10 may be the base station provided in Embodiment 1 of the present application, and the user equipment 30 may be the user equipment provided in Embodiment 2 of the present application.

The base station 10 uses a frequency band of relatively low frequencies (for example, 3.5 GHz and 5 GHz) to cover a relatively large region. Within a coverage area of the base station 10, multiple small cells 20 are deployed to perform hotspot coverage. The small cell 20 uses a frequency band of relatively high frequencies (for example, 28 GHz and 38 GHz) to cover a relatively small region. The user equipment 30 that is within the coverage area of the base station 10 and is within a coverage area of a small cell 20 may communicate, by using one or more frequency bands, with the base station 10 and the small cell 20 at the same time.

For example, the user equipment 30 may communicate with the base station 10 by using a frequency band of 5 GHz, and at the same time, may further communicate with the small cell 20 by using a frequency band of 28 GHz; or, the user equipment 30 may communicate with the base station 10 by using two frequency bands, that is, 3.5 GHz and 5 GHz, and at the same time, further communicate with the small cell 20 by using a frequency band of 28 GHz; or, the user equipment 30 may communicate with the base station 10 by using a frequency band of 5 GHz, and at the same time, may further communicate with the small cell 20 by using frequency bands of 28 GHz and 38 GHz.

Data received or sent by the user equipment 30 that is within the coverage area of the base station 10 is exchanged with a core network by using the base station 10, that is, downlink data of the user equipment 30 is delivered from the core network to the base station 10, and the base station 10 directly transmits the data to the user equipment 30 by using the frequency band of relatively low frequencies. Alternatively, the base station 10 first transmits the data to the small cell 20 by using the frequency band of relatively high frequencies or by using a wired fiber, and then the small cell 20 transmits the data to the user equipment 30 by using the frequency band of relatively high frequencies.

Embodiment 5

Figure 7:
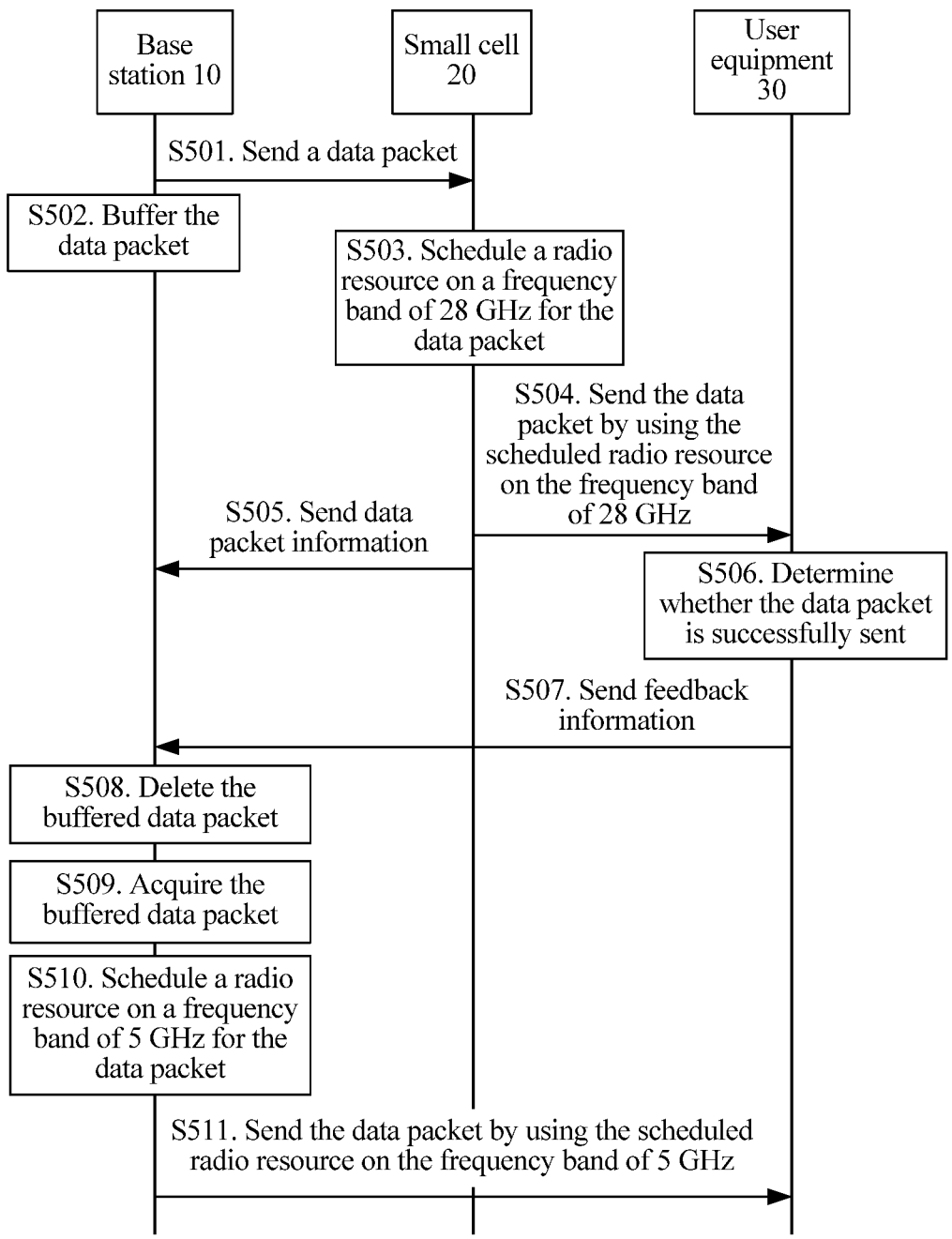
FIG. 7 is a schematic signaling flowchart of an adaptive retransmission method according to Embodiment 5 of the present application.

As shown in FIG. 7, FIG. 7 is a schematic signaling flowchart of an adaptive retransmission method according to Embodiment 5 of the present application. The adaptive retransmission method is applied to the communications system in Embodiment 4 and is applicable to a scenario in the communications system in which user equipment is within an overlapping coverage area of a base station and a small cell. Embodiment 5 of the present application is described by using an example in which the base station communicates with the user equipment by using a frequency band of 5 GHz and the small cell communicates with the user equipment by using a frequency band of 28 GHz.

The adaptive retransmission method includes the following steps.

Step S501. The base station sends a data packet to the small cell.

The base station includes a Packet Data Convergence Protocol (PDCP) layer, a Radio Link Control (RLC) layer, a Medium Access Control (MAC) layer, and a physical (PHY) layer. The data packet is first processed by the PDCP layer and the RLC layer that are of the base station, and then is sent to the small cell.

Step S502. The base station buffers the data packet.

The RLC layer of the base station buffers the data packet sent to the small cell, so that when the small cell fails to send the data packet to the user equipment, the data packet is re-sent to the user equipment.

Step S503. The small cell schedules a radio resource on a frequency band of 28 GHz for the data packet.

Because the data packet received by the small cell is the data packet that has been processed by the PDCP layer and the RLC layer that are of the base station, the small cell does not need to have a PDCP layer and an RLC layer, but only needs to include a MAC layer and a PHY layer, which can effectively reduce a construction cost of the small cell, thereby reducing a construction cost of an entire communications system.

After the small cell receives the data packet, the MAC layer of the small cell schedules the radio resource on the frequency band of 28 GHz for the data packet.

Step S504. The small cell sends the data packet to the user equipment by using the scheduled radio resource on the frequency band of 28 GHz.

After the MAC layer of the small cell schedules the radio resource on the frequency band of 28 GHz for the data packet, the PHY layer of the small cell sends the data packet to the user equipment by using the radio resource on the frequency band of 28 GHz that is scheduled by the MAC layer of the small cell for the data packet.

Step S505. The small cell sends data packet information to the base station.

The data packet information includes an identifier of the data packet sent by the small cell to the user equipment, to inform the base station of the data packet that has been sent by the small cell to the user equipment.

Step S506. The user equipment determines whether the data packet is successfully sent.

Step S507. The user equipment sends feedback information to the base station.

Specifically, if the user equipment determines that the data packet is successfully sent, the feedback information is acknowledgement (ACK) information; and if the user equipment determines that the data packet fails to be sent, the feedback information is negative acknowledgement (NACK) information.

When the feedback information is the ACK information, step S508 is executed.

When the feedback information is the NACK information, step S509 to step S511 are executed.

Figure 8:
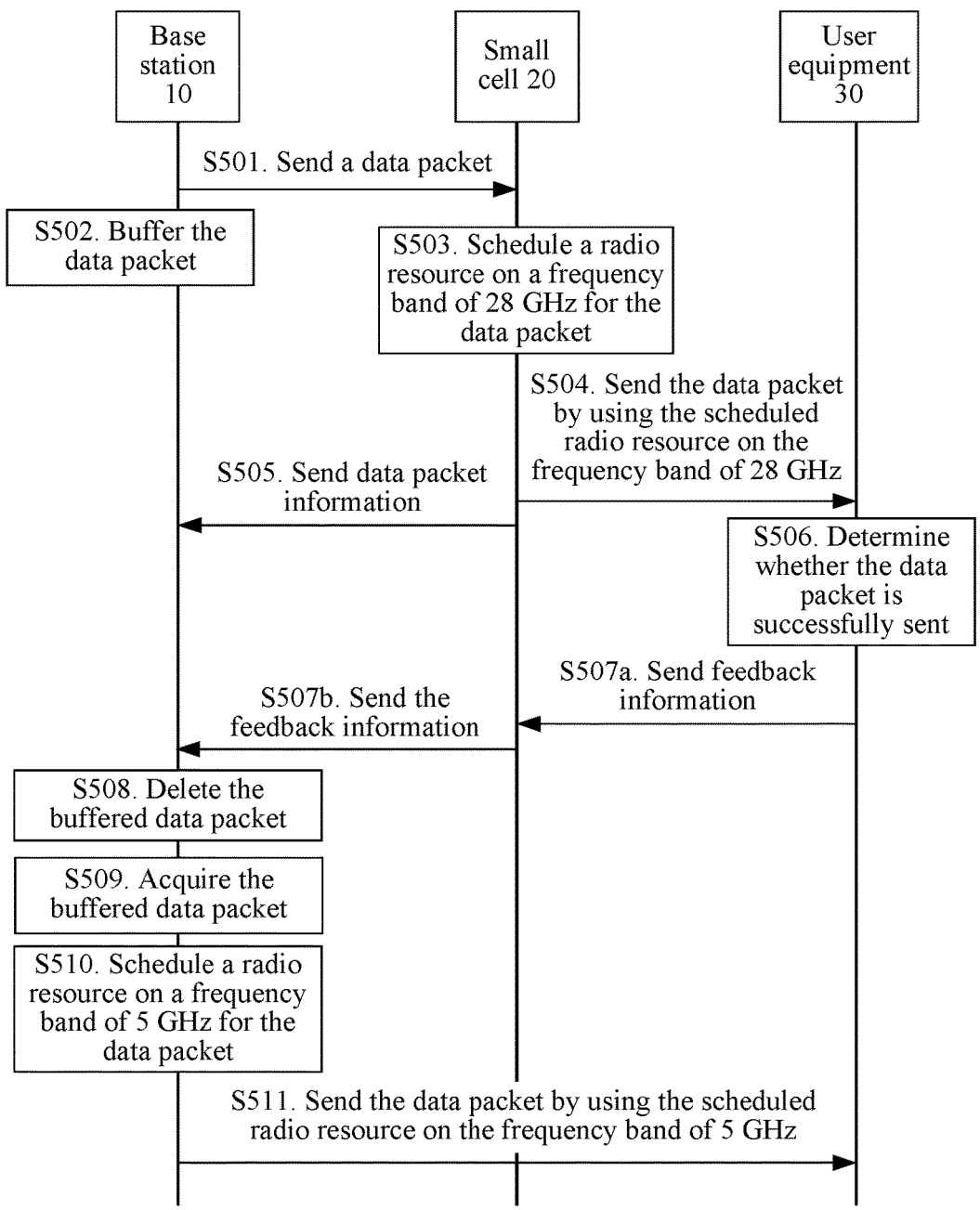
FIG. 8 is a schematic signaling flowchart of another adaptive retransmission method according to Embodiment 5 of the present application.

Optionally, step S507 may be divided into two steps. As shown in FIG. 8, step S507 includes:

Step S507a. The user equipment sends the feedback information to the small cell.

Step S507b. The small cell sends the feedback information to the base station.

Step S508. The base station deletes the buffered data packet.

When the base station receives the ACK information sent by the user equipment, the MAC layer of the base station determines the identifier of the data packet according to the feedback information sent by the user equipment, reports, to the RLC layer of the base station, that the data packet corresponding to the identifier has been successfully sent, and then the RLC layer of the base station deletes the buffered data packet corresponding to the identifier.

Step S509. The base station acquires the buffered data packet.

When the base station receives the NACK information sent by the user equipment, the MAC layer of the base station determines the identifier of the data packet according to the feedback information sent by the user equipment, reports, to the RLC layer of the base station, that the data packet corresponding to the identifier fails to be sent, and then the RLC layer of the base station sends, to the MAC layer of the base station, the buffered data packet corresponding to the identifier.

Step S510. The base station schedules a radio resource on a frequency band of 5 GHz for the data packet.

After the MAC layer of the base station acquires the data packet, the MAC layer of the base station schedules the radio resource on the frequency band of 5 GHz for the data packet.

When the base station receives the feedback information and the feedback information is the NACK information, the base station begins to acquire the buffered data packet and schedules the radio resource on the frequency band of 5 GHz for the data packet, that is, the base station schedules the radio resource on the frequency band of 5 GHz only for a data packet that needs to be retransmitted, which can improve utilization of the radio resource.

Step S511. The base station sends the data packet to the user equipment by using the scheduled radio resource on the frequency band of 5 GHz.

After the MAC layer of the base station schedules the radio resource on the frequency band of 5 GHz for the data packet, the PHY layer of the base station sends the data packet to the user equipment by using the radio resource on the frequency band of 5 GHz that is scheduled by the MAC layer of the base station for the data packet.

It may be understood that after receiving the data packet re-sent by the base station, the user equipment may execute step S506 to step S511 again.

According to the adaptive retransmission method provided in Embodiment 5 of the present application, a data packet is initially sent by a base station through a small cell to user equipment by using a radio resource on a first frequency band (28 GHz), and the data packet is re-sent to the user equipment by using a radio resource on a second frequency band (5 GHz). That is, initially sending the data packet and resending the data packet are performed on different frequency bands. Therefore, when the small cell schedules the radio resource for the data packet, a radio resource required for retransmitting the data packet does not need to be considered, which can effectively reduce complexity of an algorithm for scheduling the radio resource. In addition, because only the base station needs to have a retransmission function, and the small cell does not need to have the retransmission function, a construction cost of a communications system can be effectively reduced.

Embodiment 6

Figure 9:
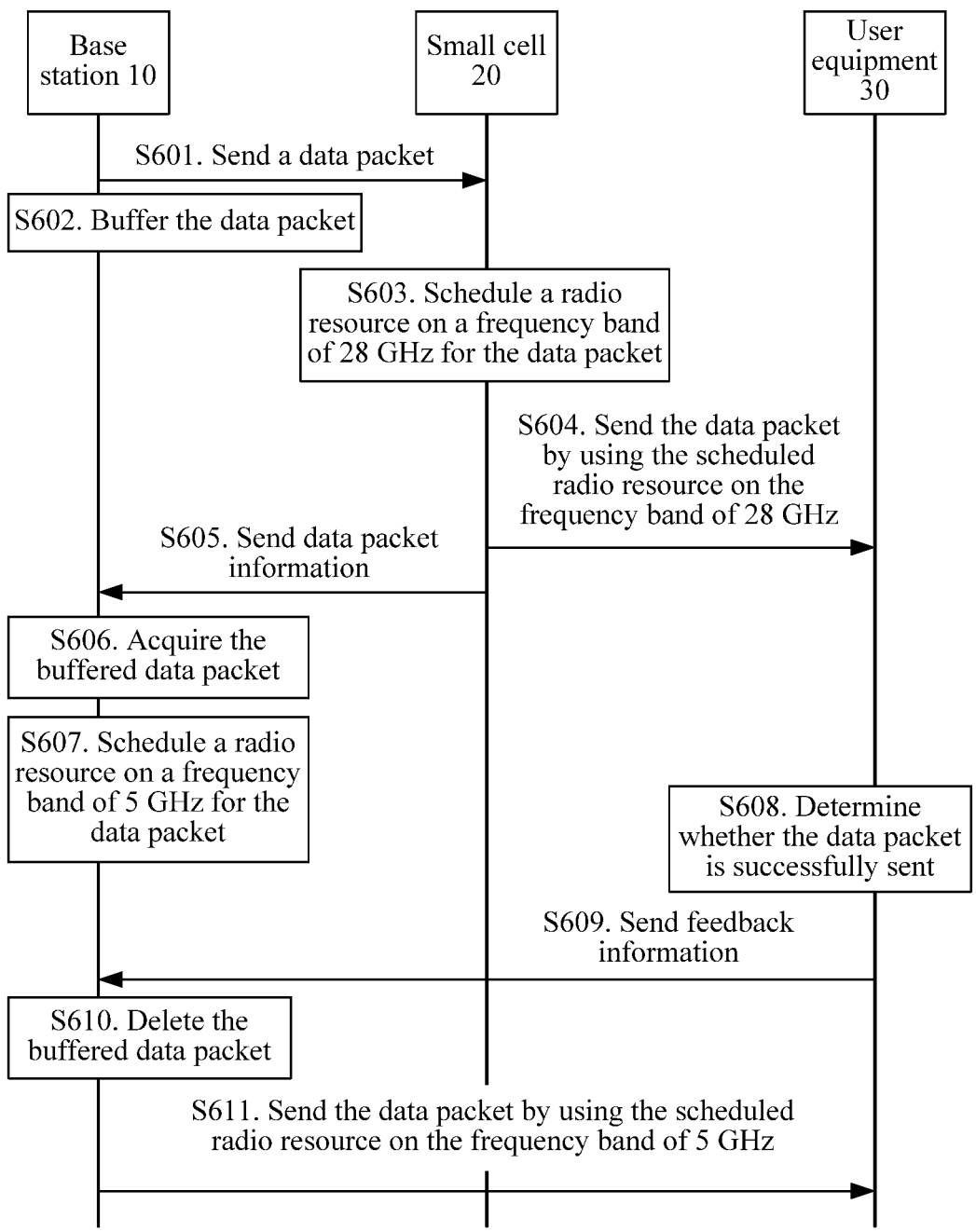
FIG. 9 is a schematic signaling flowchart of an adaptive retransmission method according to Embodiment 6 of the present application.

As shown in FIG. 9, FIG. 9 is a schematic signaling flowchart of an adaptive retransmission method according to Embodiment 6 of the present application. The adaptive retransmission method is applied to the communications system in Embodiment 4 and is applicable to a scenario in the communications system in which user equipment is within an overlapping coverage area of a base station and a small cell. Embodiment 6 of the present application is described by using an example in which the base station communicates with the user equipment by using a frequency band of 5 GHz and the small cell communicates with the user equipment by using a frequency band of 28 GHz.

The adaptive retransmission method includes the following steps:

Step S601. The base station sends a data packet to the small cell.

The base station includes a PDCP layer, an RLC layer, a MAC layer, and a PHY layer. The data packet is first processed by the PDCP layer and the RLC layer that are of the base station, and then is sent to the small cell.

Step S602. The base station buffers the data packet.

The RLC layer of the base station buffers the data packet sent to the small cell, so that when the small cell fails to send the data packet to the user equipment, the data packet is re-sent to the user equipment.

Step S603. The small cell schedules a radio resource on a frequency band of 28 GHz for the data packet.

Because the data packet received by the small cell is the data packet that has been processed by the PDCP layer and the RLC layer that are of the base station, the small cell does not need to have a PDCP layer and an RLC layer, but only needs to include a MAC layer and a PHY layer, which can effectively reduce a construction cost of the small cell, thereby reducing a construction cost of an entire communications system.

After the small cell receives the data packet, the MAC layer of the small cell schedules the radio resource on the frequency band of 28 GHz for the data packet.

Step S604. The small cell sends the data packet to the user equipment by using the scheduled radio resource on the frequency band of 28 GHz.

After the MAC layer of the small cell schedules the radio resource on the frequency band of 28 GHz for the data packet, the PHY layer of the small cell sends the data packet to the user equipment by using the radio resource on the frequency band of 28 GHz that is scheduled by the MAC layer of the small cell for the data packet.

Step S605. The small cell sends data packet information to the base station.

The data packet information includes an identifier of the data packet sent by the small cell to the user equipment, to inform the base station of the data packet that has been sent by the small cell to the user equipment.

Step S606. The base station acquires the buffered data packet.

The MAC layer of the base station determines the identifier of the data packet according to feedback information sent by the user equipment and reports the identifier to the RLC layer of the base station, and then the RLC layer of the base station sends, to the MAC layer of the base station, the buffered data packet corresponding to the identifier.

Step S607. The base station schedules a radio resource on a frequency band of 5 GHz for the data packet.

After the MAC layer of the base station acquires the data packet, the MAC layer of the base station schedules the radio resource on the frequency band of 5 GHz for the data packet.

The base station acquires the buffered data packet before receiving the feedback information, and schedules the radio resource on the frequency band of 5 GHz for the data packet; if the received feedback information is NACK information, there is no need to wait for the base station to schedule the radio resource for the data packet, and the data packet is sent directly by using the radio resource on the frequency band of 5 GHz that has been scheduled for the data packet, thereby reducing time for retransmitting the data packet.

Step S608. The user equipment determines whether the data packet is successfully sent.

Step S609. The user equipment sends feedback information to the base station.

Specifically, if the user equipment determines that the data packet is successfully sent, the feedback information is ACK information; and if the user equipment determines that the data packet fails to be sent, the feedback information is NACK information.

When the feedback information is the ACK information, step S610 is executed.

When the feedback information is the NACK information, step S611 is executed.

Figure 10:
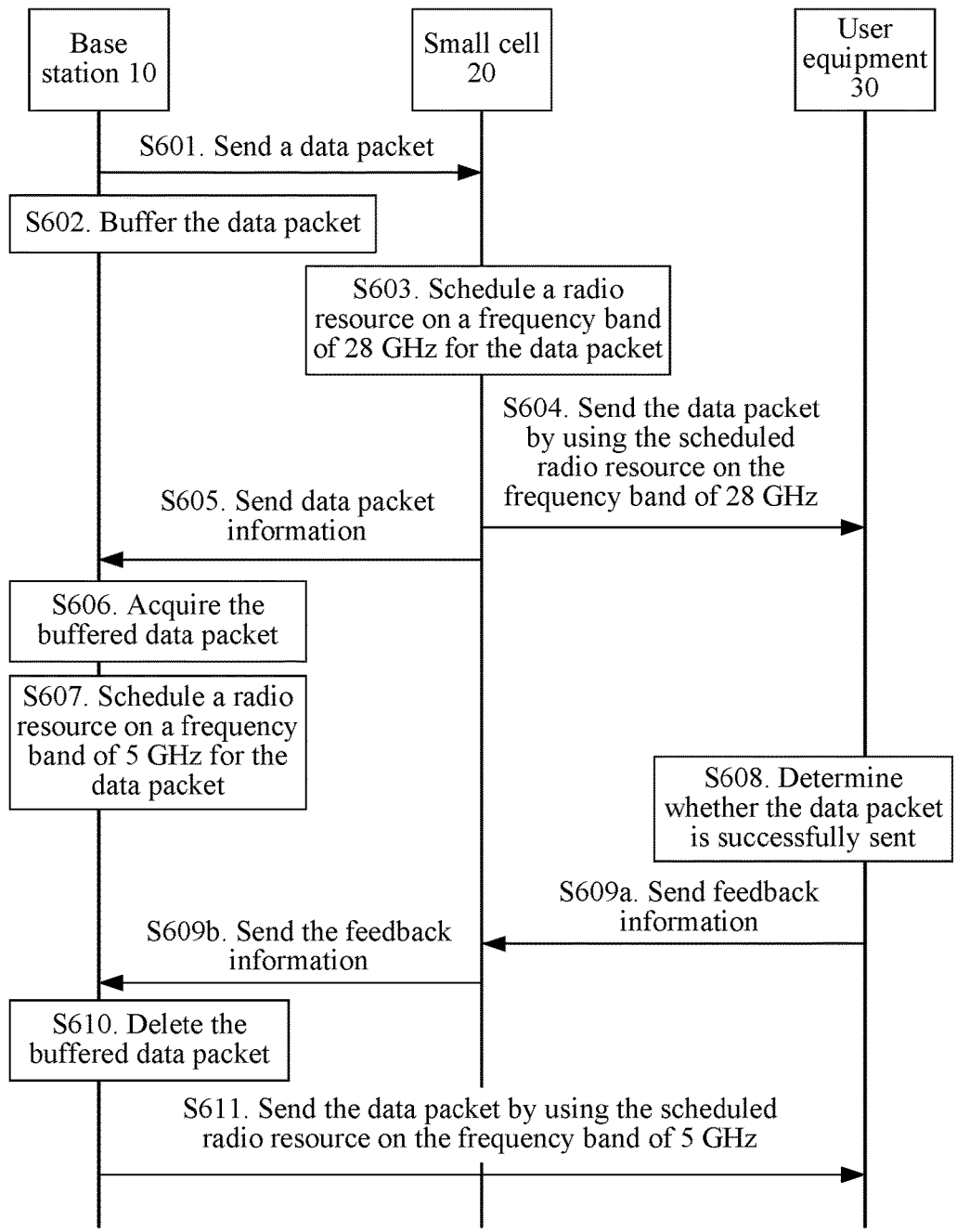
FIG. 10 is a schematic signaling flowchart of another adaptive retransmission method according to Embodiment 6 of the present application.

Optionally, step S609 may be divided into two steps. As shown in FIG. 10, step S609 includes:

Step S609a. The user equipment sends the feedback information to the small cell.

Step S609b. The small cell sends the feedback information to the base station.

Step S610. The base station deletes the buffered data packet.

When the base station receives the ACK information sent by the user equipment, the MAC layer of the base station determines the identifier of the data packet according to the feedback information sent by the user equipment, reports, to the RLC layer of the base station, that the data packet corresponding to the identifier has been successfully sent, and then the RLC layer of the base station deletes the buffered data packet corresponding to the identifier.

Step S611. The base station sends the data packet to the user equipment by using the scheduled radio resource on the frequency band of 5 GHz.

When the base station receives the NACK information sent by the user equipment, the PHY layer of the base station sends the data packet to the user equipment by using the radio resource on the frequency band of 5 GHz that is scheduled by the MAC layer of the base station for the data packet.

It may be understood that after receiving the data packet re-sent by the base station, the user equipment may execute step S606 to step S611 again.

According to the adaptive retransmission method provided in Embodiment 6 of the present application, a data packet is initially sent by a base station through a small cell to user equipment by using a radio resource on a first frequency band (28 GHz), and the data packet is re-sent to the user equipment by using a radio resource on a second frequency band (5 GHz). That is, initially sending the data packet and resending the data packet are performed on different frequency bands. Therefore, when the small cell schedules the radio resource for the data packet, a radio resource required for retransmitting the data packet does not need to be considered, which can effectively reduce complexity of an algorithm for scheduling the radio resource. In addition, because only the base station needs to have a retransmission function, and the small cell does not need to have the retransmission function, a construction cost of a communications system can be effectively reduced.

Embodiment 7

Figure 11:
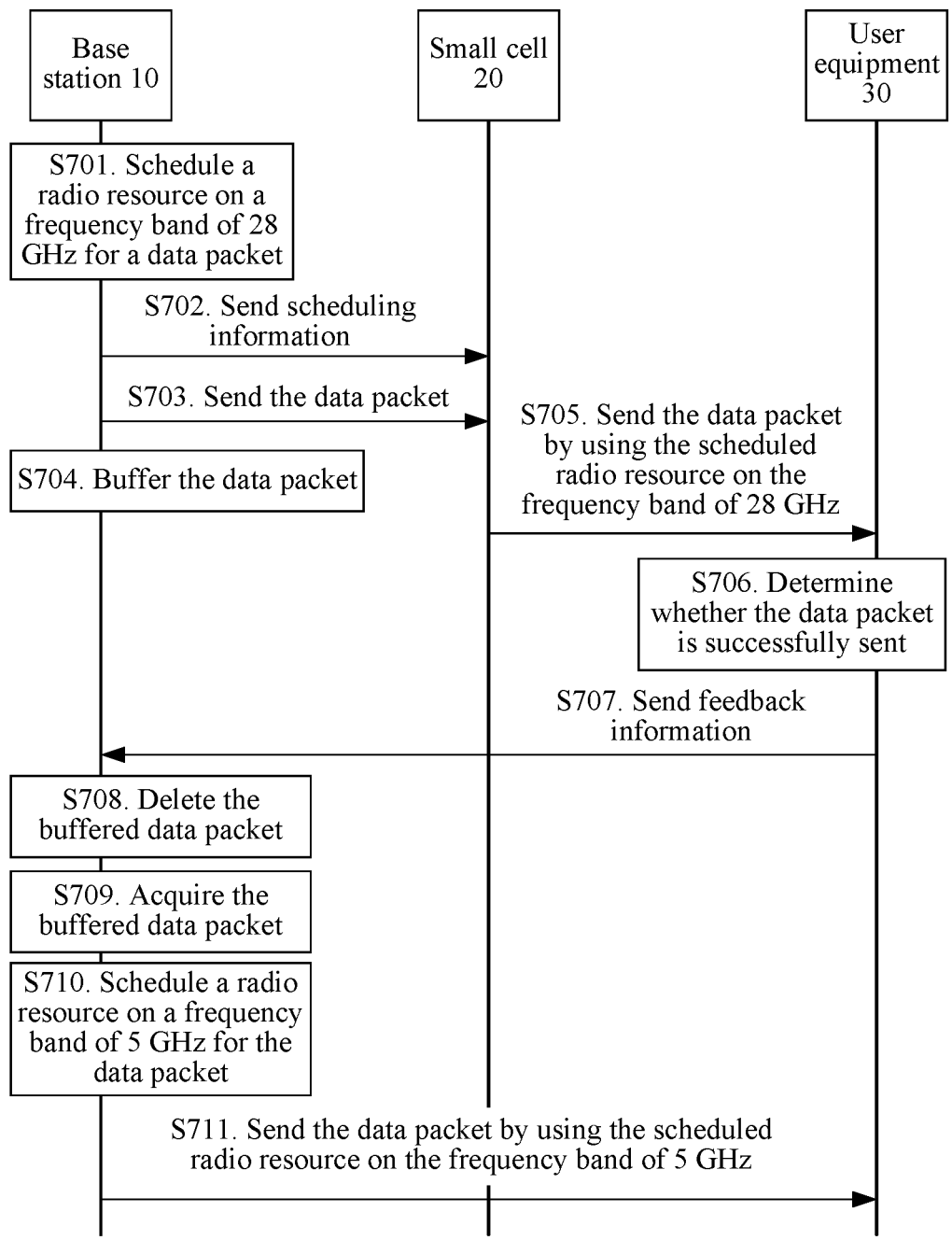
FIG. 11 is a schematic signaling flowchart of an adaptive retransmission method according to Embodiment 7 of the present application.

As shown in FIG. 11, FIG. 11 is a schematic signaling flowchart of an adaptive retransmission method according to Embodiment 7 of the present application. The adaptive retransmission method is applied to the communications system in Embodiment 4 and is applicable to a scenario in the communications system in which user equipment is within an overlapping coverage area of a base station and a small cell. Embodiment 7 of the present application is described by using an example in which the base station communicates with the user equipment by using a frequency band of 5 GHz and the small cell communicates with the user equipment by using a frequency band of 28 GHz.

The adaptive retransmission method includes the following steps:

Step S701. The base station schedules a radio resource on a frequency band of 28 GHz for a data packet.

The base station includes a PDCP layer, an RLC layer, a MAC layer, and a PHY layer. The data packet is first processed by the PDCP layer and the RLC layer that are of the base station, and then the MAC layer of the base station schedules the radio resource on the frequency band of 28 GHz for the data packet.

Step S702. The base station sends scheduling information to the small cell.

The scheduling information includes information about the radio resource on the frequency band of 28 GHz that is scheduled by the MAC layer of the base station for the data packet, for example, information about a size of the data packet, a modulation and coding scheme, and a logical channel number.

Step S703. The base station sends the data packet to the small cell.

The data packet has been processed by the PDCP layer, the RLC layer, and the MAC layer that are of the base station.

Step S704. The base station buffers the data packet.

The RLC layer of the base station buffers the data packet sent to the small cell, so that when the small cell fails to send the data packet to the user equipment, the data packet is re-sent to the user equipment.

Step S705. The small cell sends the data packet to the user equipment by using the radio resource on the frequency band of 28 GHz that is scheduled by the base station for the data packet.

Because the data packet received by the small cell is the data packet that has been processed by the PDCP layer, the RLC layer, and the MAC layer that are of the base station, the small cell does not need to have a PDCP layer, an RLC layer, and a MAC layer, but only needs to include a PHY layer, which can effectively reduce a construction cost of the small cell, thereby reducing a construction cost of an entire communications system.

After the small cell receives the data packet, the PHY layer of the small cell determines, according to the scheduling information, the radio resource on the frequency band of 28 GHz that is scheduled by the MAC layer of the base station for the data packet, and then sends the data packet to the user equipment by using the radio resource on the frequency band of 28 GHz that is scheduled by the MAC layer of the base station for the data packet.

Step S706. The user equipment determines whether the data packet is successfully sent.

Step S707. The user equipment sends feedback information to the base station.

Specifically, if the user equipment determines that the data packet is successfully sent, the feedback information is ACK information; and if the user equipment determines that the data packet fails to be sent, the feedback information is NACK information.

When the feedback information is the ACK information, step S708 is executed.

When the feedback information is the NACK information, step S709 to step S711 are executed.

Figure 12:
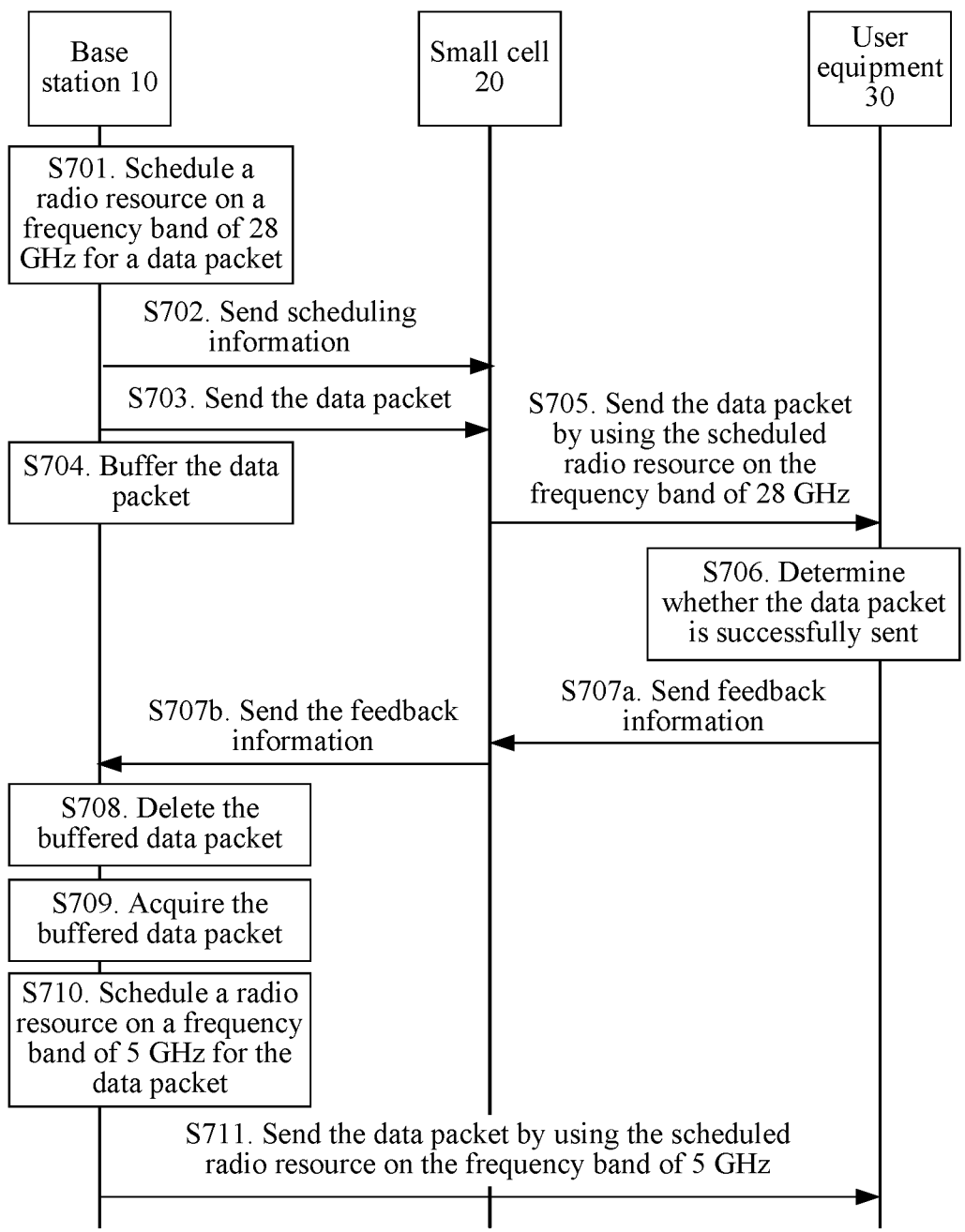
FIG. 12 is a schematic signaling flowchart of another adaptive retransmission method according to Embodiment 7 of the present application.

Optionally, step S507 may be divided into two steps. As shown in FIG. 12, step S707 includes:

Step S707a. The user equipment sends the feedback information to the small cell.

Step S707b. The small cell sends the feedback information to the base station.

Step S708. The base station deletes the buffered data packet.

When the base station receives the ACK information sent by the user equipment, the MAC layer of the base station determines an identifier of the data packet and reports, to the RLC layer of the base station, that the data packet corresponding to the identifier has been successfully sent, and then the RLC layer of the base station deletes the buffered data packet corresponding to the identifier.

Step S709. The base station acquires the buffered data packet.

When the base station receives the NACK information sent by the user equipment, the MAC layer of the base station determines the identifier of the data packet and reports, to the RLC layer of the base station, that the data packet corresponding to the identifier fails to be sent, and then the RLC layer of the base station sends, to the MAC layer of the base station, the buffered data packet corresponding to the identifier.

Step S710. The base station schedules a radio resource on a frequency band of 5 GHz for the data packet.

After the MAC layer of the base station acquires the data packet, the MAC layer of the base station schedules the radio resource on the frequency band of 5 GHz for the data packet.

It should be noted that the base station may include two MAC layers, where one MAC layer schedules the radio resource on the frequency band of 28 GHz for the data packet, and the other MAC layer schedules the radio resource on the frequency band of 5 GHz for the data packet, thereby improving efficiency of the base station for scheduling a radio resource for the data packet.

When the base station receives the feedback information and the feedback information is the NACK information, the base station begins to acquire the buffered data packet and schedules the radio resource on the frequency band of 5 GHz for the data packet, that is, the base station schedules the radio resource on the frequency band of 5 GHz only for a data packet that needs to be retransmitted, which can improve utilization of the radio resource.

Step S711. The base station sends the data packet to the user equipment by using the scheduled radio resource on the frequency band of 5 GHz.

After the MAC layer of the base station schedules the radio resource on the frequency band of 5 GHz for the data packet, the PHY layer of the base station sends the data packet to the user equipment by using the radio resource on the frequency band of 5 GHz that is scheduled by the MAC layer of the base station for the data packet.

It may be understood that after receiving the data packet re-sent by the base station, the user equipment may execute step S706 to step S711 again.

According to the adaptive retransmission method provided in Embodiment 7 of the present application, a data packet is initially sent by a base station through a small cell to user equipment by using a radio resource on a first frequency band (28 GHz), and the data packet is re-sent to the user equipment by using a radio resource on a second frequency band (5 GHz). That is, initially sending the data packet and resending the data packet are performed on different frequency bands. Therefore, when the small cell schedules the radio resource for the data packet, a radio resource required for retransmitting the data packet does not need to be considered, which can effectively reduce complexity of an algorithm for scheduling the radio resource. In addition, because only the base station needs to have a retransmission function, and the small cell does not need to have the retransmission function, a construction cost of a communications system can be effectively reduced.

Embodiment 8

Figure 13:
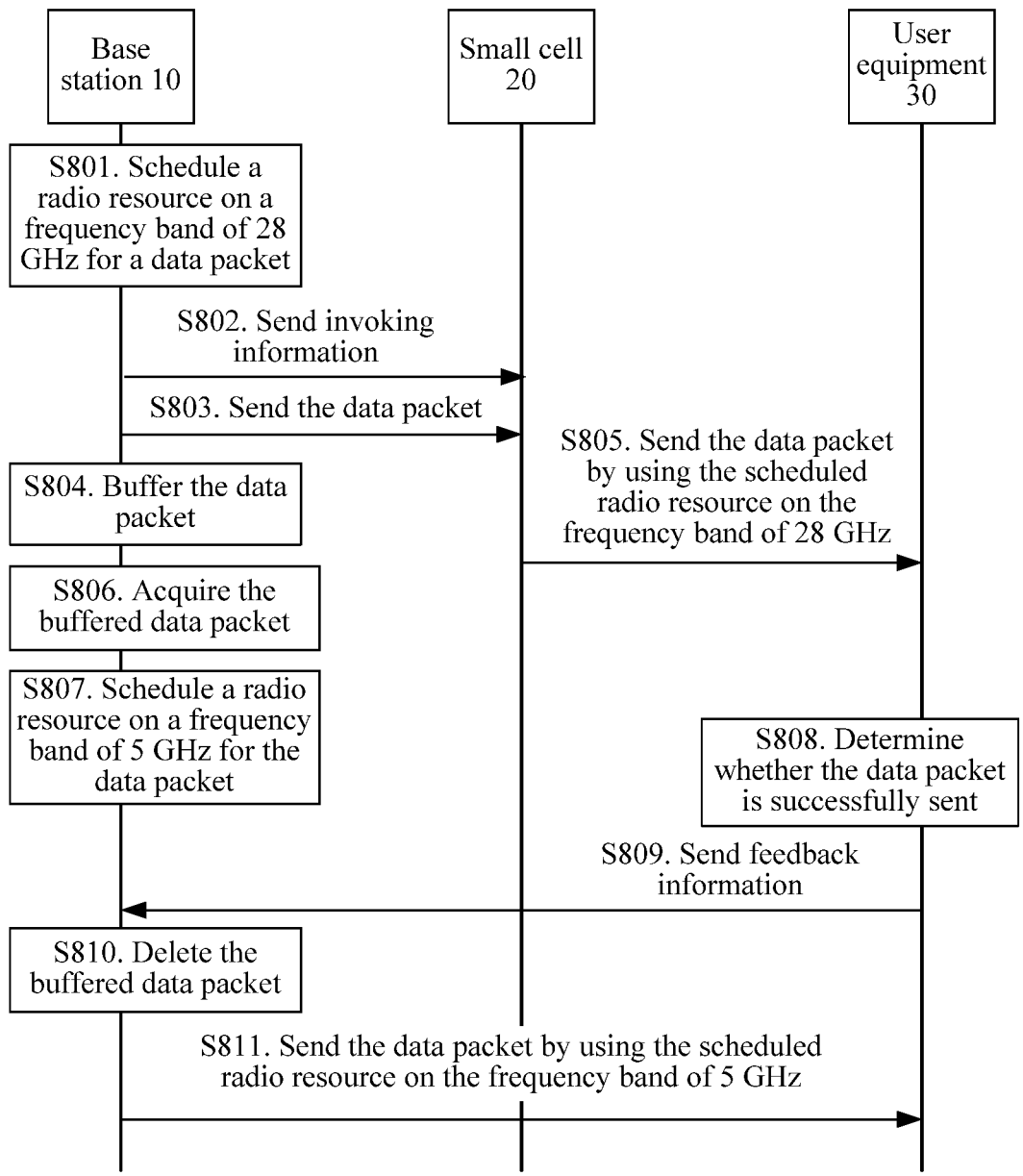
FIG. 13 is a schematic signaling flowchart of an adaptive retransmission method according to Embodiment 8 of the present application.

As shown in FIG. 13, FIG. 13 is a schematic signaling flowchart of an adaptive retransmission method according to Embodiment 8 of the present application. The adaptive retransmission method is applied to the communications system in Embodiment 4 and is applicable to a scenario in the communications system in which user equipment is within an overlapping coverage area of a base station and a small cell. Embodiment 8 of the present application is described by using an example in which the base station communicates with the user equipment by using a frequency band of 5 GHz and the small cell communicates with the user equipment by using a frequency band of 28 GHz.

The adaptive retransmission method includes the following steps.

Step S801. The base station schedules a radio resource on a frequency band of 28 GHz for a data packet.

The base station includes a PDCP layer, an RLC layer, a MAC layer, and a PHY layer. The data packet is first processed by the PDCP layer and the RLC layer that are of the base station, and then the MAC layer of the base station schedules the radio resource on the frequency band of 28 GHz for the data packet.

Step S802. The base station sends scheduling information to the small cell.

The scheduling information includes information about the radio resource on the frequency band of 28 GHz that is scheduled by the MAC layer of the base station for the data packet, for example, information about a size of the data packet, a modulation and coding scheme, and a logical channel number.

Step S803. The base station sends the data packet to the small cell.

The data packet has been processed by the PDCP layer, the RLC layer, and the MAC layer that are of the base station.

Step S804. The base station buffers the data packet.

The RLC layer of the base station buffers the data packet sent to the small cell, so that when the small cell fails to send the data packet to the user equipment, the data packet is re-sent to the user equipment.

Step S805. The small cell sends the data packet to the user equipment by using the radio resource on the frequency band of 28 GHz that is scheduled by the base station for the data packet.

Because the data packet received by the small cell is the data packet that has been processed by the PDCP layer, the RLC layer, and the MAC layer that are of the base station, the small cell does not need to have a PDCP layer, an RLC layer, and a MAC layer, but only needs to include a PHY layer, which can effectively reduce a construction cost of the small cell, thereby reducing a construction cost of an entire communications system.

After the small cell receives the data packet, the PHY layer of the small cell determines, according to the scheduling information, the radio resource on the frequency band of 28 GHz that is scheduled by the MAC layer of the base station for the data packet, and then sends the data packet to the user equipment by using the radio resource on the frequency band of 28 GHz that is scheduled by the MAC layer of the base station for the data packet.

Step S806. The base station acquires the buffered data packet.

The MAC layer of the base station determines an identifier of the data packet and reports the identifier to the RLC layer of the base station, and then the RLC layer of the base station sends, to the MAC layer of the base station, the buffered data packet corresponding to the identifier.

Step S807. The base station schedules a radio resource on a frequency band of 5 GHz for the data packet.

After the MAC layer of the base station acquires the data packet, the MAC layer of the base station schedules the radio resource on the frequency band of 5 GHz for the data packet.

It should be noted that the base station may include two MAC layers, where one MAC layer schedules the radio resource on the frequency band of 28 GHz for the data packet, and the other MAC layer schedules the radio resource on the frequency band of 5 GHz for the data packet, thereby improving efficiency of the base station for scheduling a radio resource for the data packet.

The base station acquires the buffered data packet before receiving the feedback information, and schedules the radio resource on the frequency band of 5 GHz for the data packet; if the received feedback information is NACK information, there is no need to wait for the base station to schedule the radio resource for the data packet, and the data packet is sent directly by using the radio resource on the frequency band of 5 GHz that has been scheduled for the data packet, thereby reducing time for retransmitting the data packet.

Step S808. The user equipment determines whether the data packet is successfully sent.

Step S809. The user equipment sends feedback information to the base station.

Specifically, if the user equipment determines that the data packet is successfully sent, the feedback information is ACK information; and if the user equipment determines that the data packet fails to be sent, the feedback information is NACK information.

When the feedback information is the ACK information, step S810 is executed.

When the feedback information is the NACK information, step S811 is executed.

Figure 14:
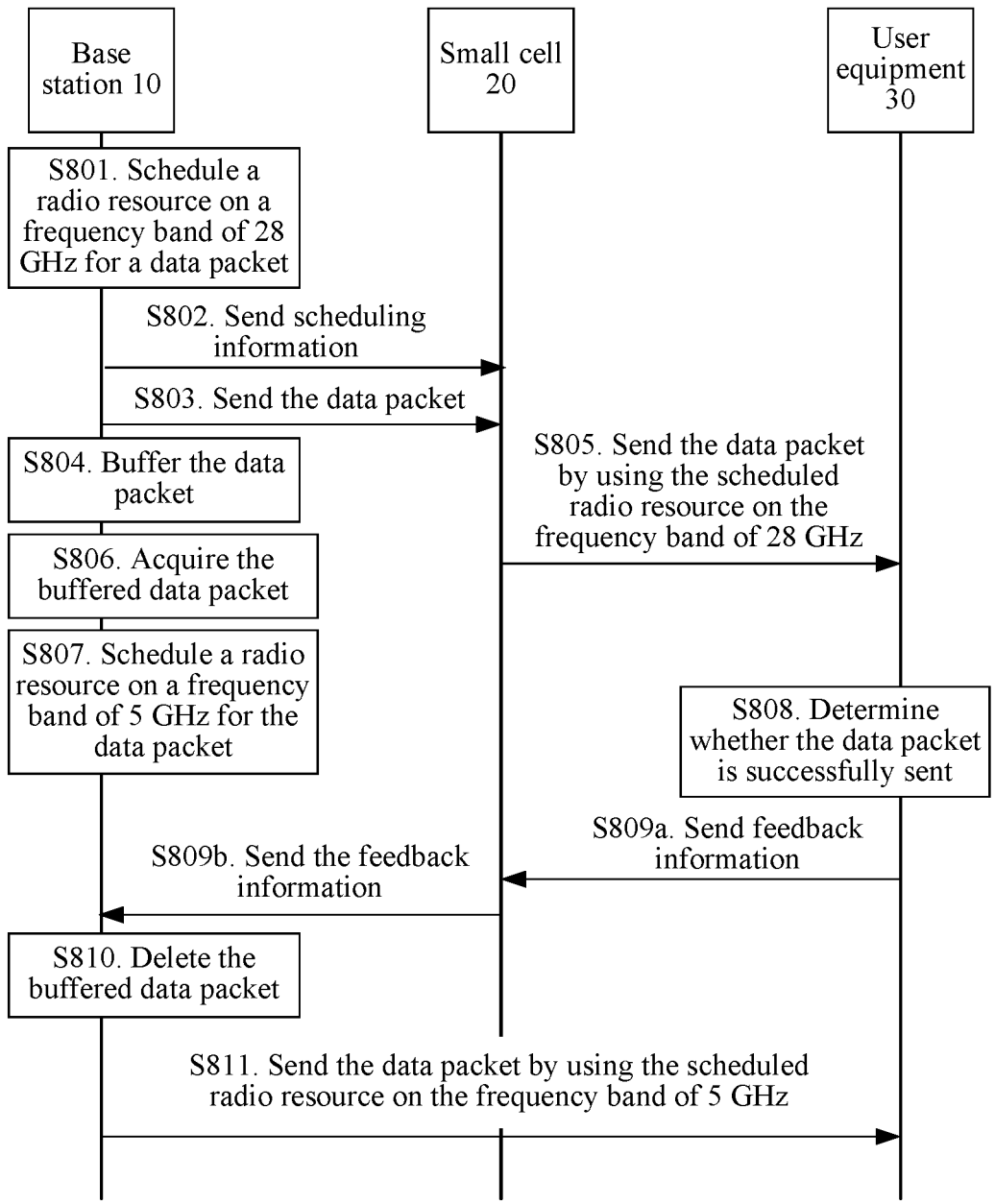
FIG. 14 is a schematic signaling flowchart of another adaptive retransmission method according to Embodiment 8 of the present application.

Optionally, step S809 may be divided into two steps. As shown in FIG. 14, step S809 includes:

Step S809a. The user equipment sends the feedback information to the small cell.

Step S809b. The small cell sends the feedback information to the base station.

Step S810. The base station deletes the buffered data packet.

When the base station receives the ACK information sent by the user equipment, the MAC layer of the base station determines an identifier of the data packet and reports, to the RLC layer of the base station, that the data packet corresponding to the identifier has been successfully sent, and then the RLC layer of the base station deletes the buffered data packet corresponding to the identifier.

Step S811. The base station sends the data packet to the user equipment by using the scheduled radio resource on the frequency band of 5 GHz.

When the base station receives the NACK information sent by the user equipment, the PHY layer of the base station sends the data packet to the user equipment by using the radio resource on the frequency band of 5 GHz that is scheduled by the MAC layer of the base station for the data packet.

It may be understood that after receiving the data packet re-sent by the base station, the user equipment may execute step S806 to step S811 again.

According to the adaptive retransmission method provided in Embodiment 8 of the present application, a data packet is initially sent by a base station through a small cell to user equipment by using a radio resource on a first frequency band (28 GHz), and the data packet is re-sent to the user equipment by using a radio resource on a second frequency band (5 GHz). That is, initially sending the data packet and resending the data packet are performed on different frequency bands. Therefore, when the small cell schedules the radio resource for the data packet, a radio resource required for retransmitting the data packet does not need to be considered, which can effectively reduce complexity of an algorithm for scheduling the radio resource. In addition, because only the base station needs to have a retransmission function, and the small cell does not need to have the retransmission function, a construction cost of a communications system can be effectively reduced.

Embodiment 9

Figure 15:
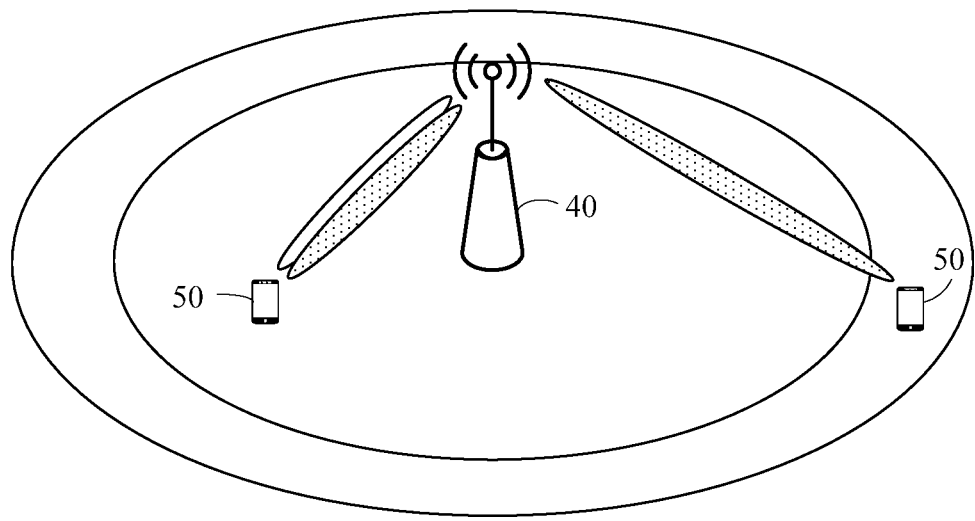
FIG. 15 is a schematic diagram of an architecture of a communications system according to Embodiment 9 of the present application.

As shown in FIG. 15, FIG. 15 is a schematic diagram of an architecture of a communications system according to Embodiment 9 of the present application. The communications system includes a base station 40 and user equipment 50. The base station 40 may be the base station provided in Embodiment 1, and the user equipment so may be the user equipment provided in Embodiment 2.

Figure 16:
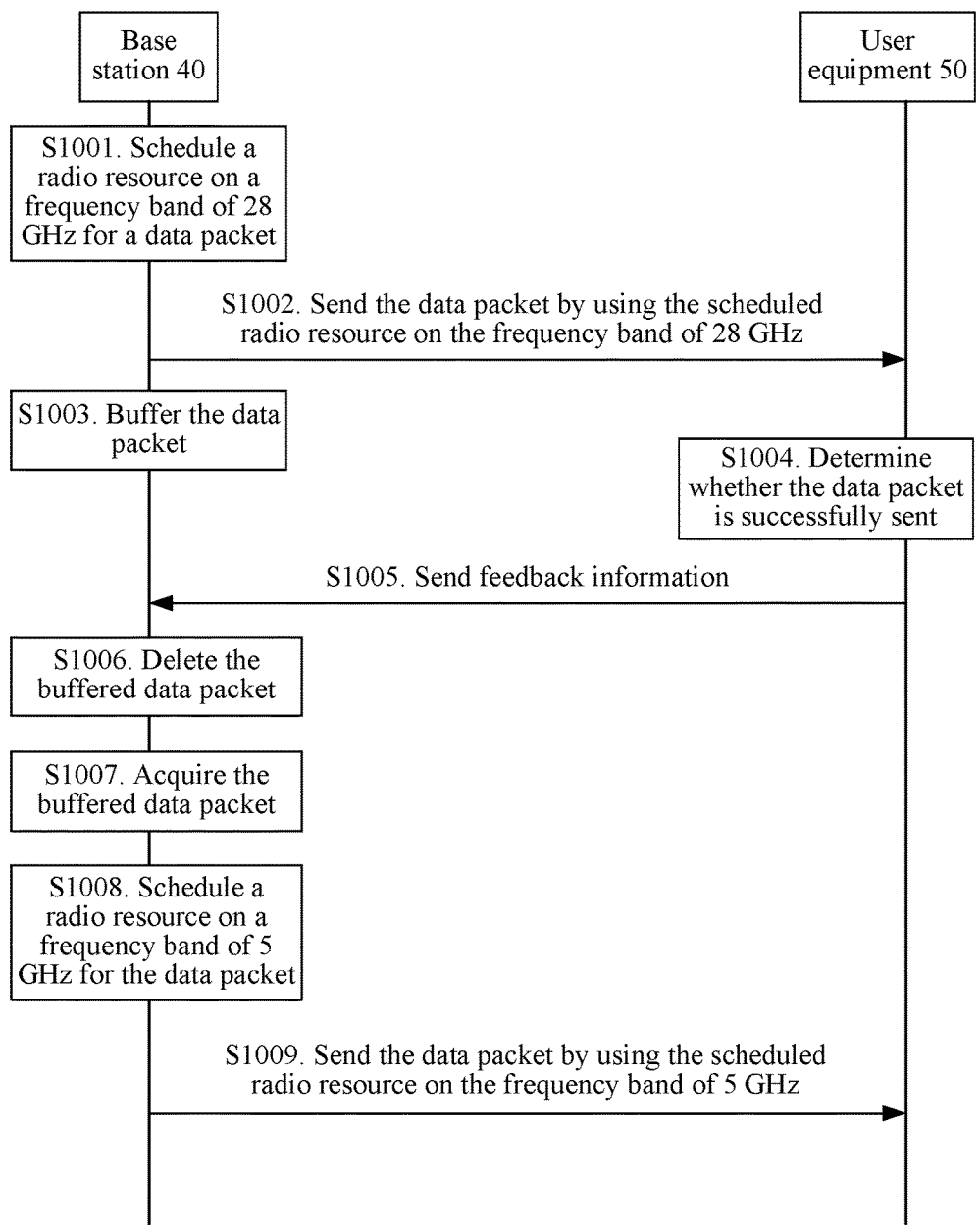
FIG. 16 is a schematic signaling flowchart of an adaptive retransmission method according to Embodiment 10 of the present application.

The base station 40 uses at least two frequency bands to communicate with the user equipment 50. A frequency band of relatively high frequencies has a relatively small coverage area, and a frequency band of relatively low frequencies has a relatively large coverage area. As shown in FIG. 16, the base station 40 uses two frequency bands to communicate with the user equipment 50, and the user equipment 50 that is within the coverage area of the frequency band of relatively high frequencies can use the two frequency bands at the same time to communicate with the base station 40. However, the user equipment 50 that is outside the coverage area of the frequency band of relatively high frequencies and is within the coverage area of the frequency band of relatively low frequencies can use only the frequency band of relatively low frequencies to communicate with the base station 40.

A data packet received or sent by the user equipment that is within the coverage area of the base station 40 is exchanged with a core network by using the base station 40, that is, downlink data of the user equipment so is delivered from the core network to the base station 40, and the base station 40 may use one or more frequency bands to directly send the downlink data to the user equipment 50.

Embodiment 10

As shown in FIG. 16, FIG. 16 is a schematic signaling flowchart of an adaptive retransmission method according to Embodiment 10 of the present application. The adaptive retransmission method is applied to the communications system in Embodiment 9 and is applicable to a scenario in the communications system in which user equipment is within a coverage area of a lowest frequency band of a base station. Embodiment 10 of the present application is described by using an example in which the base station communicates with the user equipment by using a frequency band of 5 GHz and a frequency band of 28 GHz.

The adaptive retransmission method includes the following steps:

Step S1001. The base station schedules a radio resource on a frequency band of 28 GHz for a data packet.

The base station includes a PDCP layer, an RLC layer, a MAC layer, and a PHY layer. The data packet is first processed by the PDCP layer and the RLC layer that are of the base station, and then the MAC layer of the base station schedules the radio resource on the frequency band of 28 GHz for the data packet.

Step S1002. The base station sends the data packet to the user equipment by using the scheduled radio resource on the frequency band of 28 GHz.

The PHY layer of the base station sends the data packet to the user equipment by using the radio resource on the frequency band of 28 GHz that is scheduled by the MAC layer of the base station for the data packet.

Step S1003. The base station buffers the data packet.

The RLC layer of the base station buffers the data packet sent to the user equipment, so that when the base station fails to send the data packet to the user equipment, the data packet is re-sent to the user equipment.

Step S1004. The user equipment determines whether the data packet is successfully sent.

Step S1005. The user equipment sends feedback information to the base station.

Specifically, if the user equipment determines that the data packet is successfully sent, the feedback information is ACK information; and if the user equipment determines that the data packet fails to be sent, the feedback information is NACK information.

When the feedback information is the ACK information, step S1006 is executed.

When the feedback information is the NACK information, step S1007 to step S1009 are executed.

Step S1006. The base station deletes the buffered data packet.

When the base station receives the ACK information sent by the user equipment, the MAC layer of the base station determines an identifier of the data packet and reports, to the RLC layer of the base station, that the data packet corresponding to the identifier has been successfully sent, and then the RLC layer of the base station deletes the buffered data packet corresponding to the identifier.

Step S1007. The base station acquires the buffered data packet.

When the base station receives the NACK information sent by the user equipment, the MAC layer of the base station determines the identifier of the data packet and reports, to the RLC layer of the base station, that the data packet corresponding to the identifier fails to be sent, and then the RLC layer of the base station sends, to the MAC layer of the base station, the buffered data packet corresponding to the identifier.

Step S1008. The base station schedules a radio resource on a frequency band of 5 GHz for the data packet.

After the MAC layer of the base station acquires the data packet, the MAC layer of the base station schedules the radio resource on the frequency band of 5 GHz for the data packet.

It should be noted that the base station may include two MAC layers, where one MAC layer schedules the radio resource on the frequency band of 28 GHz for the data packet, and the other MAC layer schedules the radio resource on the frequency band of 5 GHz for the data packet, thereby improving efficiency of the base station for scheduling a radio resource for the data packet.

When the base station receives the feedback information and the feedback information is the NACK information, the base station begins to acquire the buffered data packet and schedules the radio resource on the frequency band of 5 GHz for the data packet, that is, the base station schedules the radio resource on the frequency band of 5 GHz only for a data packet that needs to be retransmitted, which can improve utilization of the radio resource.

Step S1009. The base station sends the data packet to the user equipment by using the scheduled radio resource on the frequency band of 5 GHz.

After the MAC layer of the base station schedules the radio resource on the frequency band of 5 GHz for the data packet, the PHY layer of the base station sends the data packet to the user equipment by using the radio resource on the frequency band of 5 GHz that is scheduled by the MAC layer of the base station for the data packet.

It may be understood that after receiving the data packet re-sent by the base station, the user equipment may execute step S1004 to step S1009 again.

According to the adaptive retransmission method provided in Embodiment 10 of the present application, a base station initially sends a data packet to user equipment by using a radio resource on a first frequency band, and if the data packet fails to be sent, the base station sends the data packet to the user equipment by using a radio resource on a second frequency band. The data packet is initially sent by the base station to the user equipment by using the radio resource on the first frequency band, and the data packet is re-sent to the user equipment by using the radio resource on the second frequency band. That is, initially sending the data packet and resending the data packet are performed on different frequency bands. Therefore, when the base station schedules the radio resource on the first frequency band for the data packet, a radio resource required for retransmitting the data packet does not need to be considered, which can effectively reduce complexity of an algorithm for scheduling the radio resource.

Embodiment 11

Figure 17:
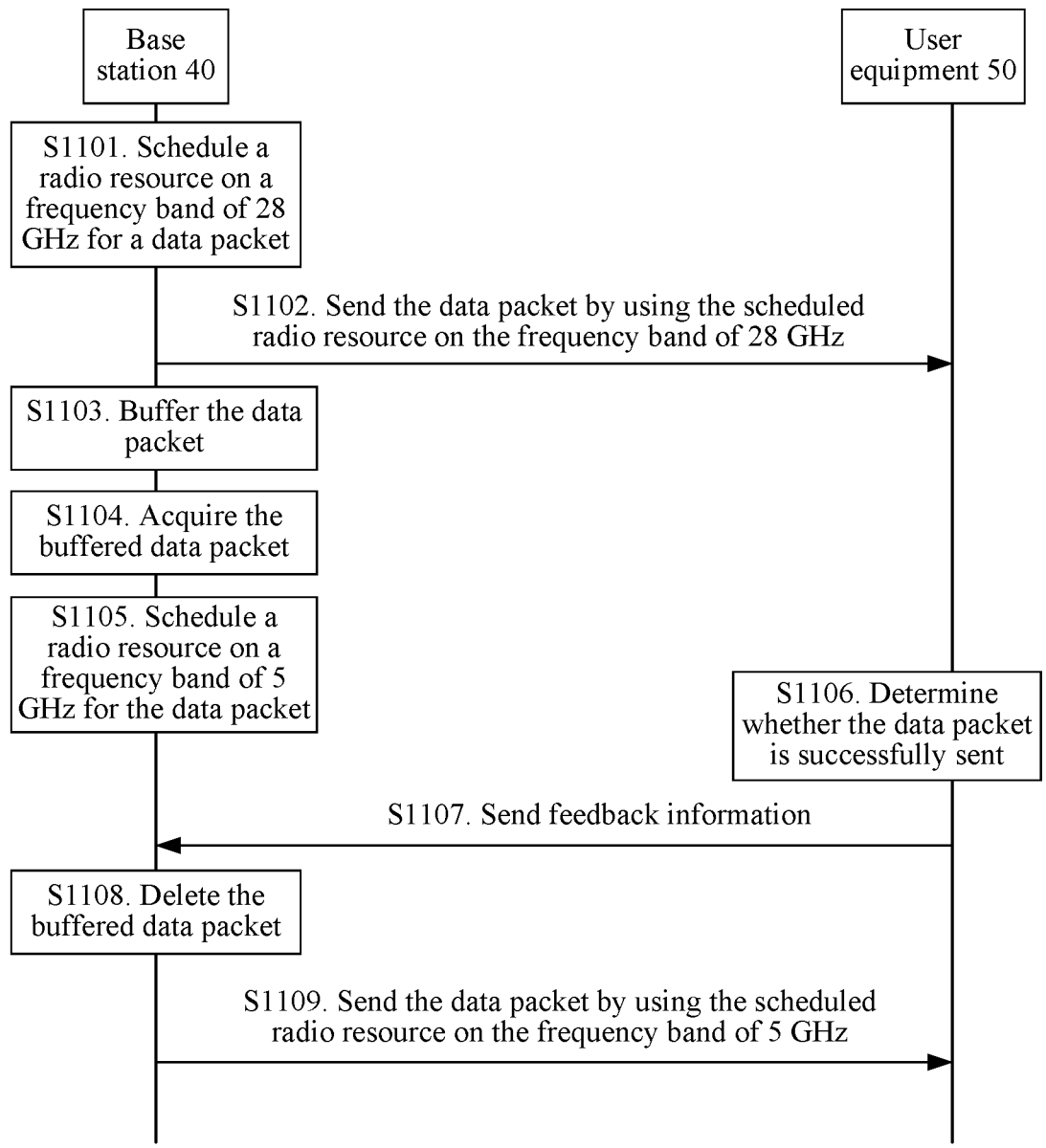
FIG. 17 is a schematic signaling flowchart of an adaptive retransmission method according to Embodiment 11 of the present application.

As shown in FIG. 17, FIG. 17 is a schematic signaling flowchart of an adaptive retransmission method according to Embodiment 11 of the present application. The adaptive retransmission method is applied to the communications system in Embodiment 9 and is applicable to a scenario in the communications system in which user equipment is within a coverage area of a lowest frequency band of a base station. Embodiment 11 of the present application is described by using an example in which the base station communicates with the user equipment by using a frequency band of 5 GHz and a frequency band of 28 GHz.

The adaptive retransmission method includes the following steps:

Step S1101. The base station schedules a radio resource on a frequency band of 28 GHz for a data packet.

The base station includes a PDCP layer, an RLC layer, a MAC layer, and a PHY layer. The data packet is first processed by the PDCP layer and the RLC layer that are of the base station, and then the MAC layer of the base station schedules the radio resource on the frequency band of 28 GHz for the data packet.

Step S1102. The base station sends the data packet to the user equipment by using the scheduled radio resource on the frequency band of 28 GHz.

The PHY layer of the base station sends the data packet to the user equipment by using the radio resource on the frequency band of 28 GHz that is scheduled by the MAC layer of the base station for the data packet.

Step S1103. The base station buffers the data packet.

The RLC layer of the base station buffers the data packet sent to the user equipment, so that when the base station fails to send the data packet to the user equipment, the data packet is re-sent to the user equipment.

Step S1104. The base station acquires the buffered data packet.

The MAC layer of the base station determines an identifier of the data packet and reports, to the RLC layer of the base station, that the data packet corresponding to the identifier fails to be sent, and then the RLC layer of the base station sends, to the MAC layer of the base station, the buffered data packet corresponding to the identifier.

Step S1105. The base station schedules a radio resource on a frequency band of 5 GHz for the data packet.

After the MAC layer of the base station acquires the data packet, the MAC layer of the base station schedules the radio resource on the frequency band of 5 GHz for the data packet.

It should be noted that the base station may include two MAC layers, where one MAC layer schedules the radio resource on the frequency band of 28 GHz for the data packet, and the other MAC layer schedules the radio resource on the frequency band of 5 GHz for the data packet, thereby improving efficiency of the base station for scheduling a radio resource for the data packet.

The base station acquires the buffered data packet before receiving the feedback information, and schedules the radio resource on the frequency band of 5 GHz for the data packet; if the received feedback information is NACK information, there is no need to wait for the base station to schedule the radio resource for the data packet, and the data packet is sent directly by using the radio resource on the frequency band of 5 GHz that has been scheduled for the data packet, thereby reducing time for retransmitting the data packet.

Step S1106. The user equipment determines whether the data packet is successfully sent.

Step S1107. The user equipment sends feedback information to the base station.

Specifically, if the user equipment determines that the data packet is successfully sent, the feedback information is ACK information; and if the user equipment determines that the data packet fails to be sent, the feedback information is NACK information.

When the feedback information is the ACK information, step S1108 is executed.

When the feedback information is the NACK information, step S1109 is executed.

Step S1108. The base station deletes the buffered data packet.

When the base station receives the ACK information sent by the user equipment, the MAC layer of the base station determines an identifier of the data packet and reports, to the RLC layer of the base station, that the data packet corresponding to the identifier has been successfully sent, and then the RLC layer of the base station deletes the buffered data packet corresponding to the identifier.

Step S1109. The base station sends the data packet to the user equipment by using the scheduled radio resource on the frequency band of 5 GHz.

When the base station receives the NACK information sent by the user equipment, the PHY layer of the base station sends the data packet to the user equipment by using the radio resource on the frequency band of 5 GHz that is scheduled by the MAC layer of the base station for the data packet.

It may be understood that after receiving the data packet re-sent by the base station, the user equipment may execute step S1104 to step S1109 again.

According to the adaptive retransmission method provided in Embodiment 11 of the present application, a base station initially sends a data packet to user equipment by using a radio resource on a first frequency band, and if the data packet fails to be sent, the base station sends the data packet to the user equipment by using a radio resource on a second frequency band. The data packet is initially sent by the base station to the user equipment by using the radio resource on the first frequency band, and the data packet is re-sent to the user equipment by using the radio resource on the second frequency band. That is, initially sending the data packet and resending the data packet are performed on different frequency bands. Therefore, when the base station schedules the radio resource on the first frequency band for the data packet, a radio resource required for retransmitting the data packet does not need to be considered, which can effectively reduce complexity of an algorithm for scheduling the radio resource.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present application are further described in detail. It should be understood that the foregoing descriptions are merely specific implementation manners of the present application, but are not intended to limit the protection scope of the present application. Any modification, equivalent replacement, or improvement made without departing from the spirit and principle of the present application should fall within the protection scope of the present application.

What is claimed is:

1. A base station, comprising:
a processor, configured to schedule a radio resource on a first frequency band for a data packet;
a transmitter, coupled to the processor, the transmitter being configured to:
send scheduling information to a small cell, wherein the scheduling information comprises information about the scheduled radio resource on the first frequency band that is scheduled for the data packet;
process the data packet by a Packet Data Convergence Protocol (PDCP) layer and a Radio Link Control (RLC) layer, wherein the RLC layer buffers the data packet in a buffer;

after processing the data packet, send the data packet to the small cell, so that the small cell sends the data packet to user equipment using the scheduled radio resource on the first frequency band; and a receiver, configured to receive feedback information sent by the user equipment, wherein the feedback information indicates whether the data packet is successfully sent;

wherein the transmitter is further configured to, when the feedback information indicates that the data packet was not successfully sent, send the data packet to the user equipment using a radio resource on a second frequency band; and wherein the first frequency band and the second frequency band have an overlapping coverage area, and the user equipment is within the overlapping coverage area.

2. The base station according to claim 1, wherein the receiver is further configured to, after the transmitter sends the data packet to the small cell, receive data packet information sent by the small cell, wherein the data packet information comprises an identifier of the data packet.

3. The base station according to claim 1, wherein the processor is further configured to:

before the receiver receives the feedback information sent by the user equipment, acquire the data packet from the buffer according to an identifier of the data packet; and schedule the radio resource on the second frequency band for the data packet.

4. The base station according to claim 1, wherein the processor is further configured to:

after the receiver receives the feedback information sent by the user equipment, acquire the data packet from the buffer according to an identifier of the data packet; and schedule the radio resource on the second frequency band for the data packet.

5. The base station according to claim 1, wherein the first frequency band is higher than the second frequency band.

6. A user equipment, comprising:

a receiver, configured to receive a data packet that is sent by a small cell using a radio resource on a first frequency band, wherein the data packet is sent from a base station to the small cell, and the data packet is first processed by Packet Data Convergence Protocol (PDCP) layer and Radio Link Control (RLC) layer of the base station before being sent to the small cell;

a processor coupled to the receiver, the processor being configured to determine whether the data packet is successfully sent; and a transmitter coupled to the processor, the transmitter being configured to send feedback information to the small cell, so that the small cell sends the feedback information to the base station, wherein the feedback information indicates whether the data packet is successfully sent;

wherein the receiver is further configured to, when the feedback information indicates that the data packet is not successfully sent, receive the data packet that is sent by the base station using a radio resource on a second frequency band;

wherein the first frequency band and the second frequency band have an overlapping coverage area, and the user equipment is within the overlapping coverage area.

7. The user equipment according to claim 6, wherein the first frequency band is higher than the second frequency band.

8. A method, comprising:

scheduling a radio resource on a first frequency band for a data packet;

sending scheduling information to a small cell, wherein the scheduling information comprises information about the radio resource on the first frequency band that is scheduled for the data packet;

processing the data packet by a Packet Data Convergence Protocol (PDCP) layer and a Radio Link Control (RLC) layer, wherein the RLC layer buffers the data packet in a buffer;

after processing the data packet, sending a data packet to a small cell, wherein the small cell sends the data packet to user equipment using the radio resource on the first frequency band;

receiving feedback information sent by the user equipment, wherein the feedback information indicates whether the data packet is successfully sent; and when the feedback information indicates that the data packet is not successfully sent, sending the data packet to the user equipment using a radio resource on a second frequency band;

wherein the first frequency band and the second frequency band have an overlapping coverage area, and the user equipment is within the overlapping coverage area.

9. The method according to claim 8, wherein after the small cell sends the data packet to the user equipment using the radio resource on the first frequency band, the method further comprises:

receiving data packet information sent by the small cell, wherein the data packet information comprises an identifier of the data packet.

10. The method according to claim 8, wherein before receiving the feedback information sent by the user equipment, the method further comprises:

acquiring the data packet from the buffer according to an identifier of the data packet; and scheduling the radio resource on the second frequency band for the data packet.

11. The method according to claim 8, wherein after receiving the feedback information sent by the user equipment, the method further comprises:

acquiring the data packet from the buffer according to an identifier of the data packet; and scheduling the radio resource on the second frequency band for the data packet.

12. The method according to claim 8, wherein the first frequency band is higher than the second frequency band.

* * * * *